United States Patent [19]

Burns

[11] 4,071,951
[45] Feb. 7, 1978

[54] CLIPPINGS CATCHER FOR A HEDGE TRIMMER

[76] Inventor: Thagrus A. Burns, 8710 Maravilla Drive, Fort Wayne, Ind. 46805

[21] Appl. No.: 788,225

[22] Filed: Apr. 18, 1977

[51] Int. Cl.² .................. B26B 19/48; A01G 3/04
[52] U.S. Cl. .................................................. 30/132
[58] Field of Search ............... 30/131, 132; 56/144, 56/194, 202

[56] References Cited

U.S. PATENT DOCUMENTS

| | | | |
|---|---|---|---|
| 2,281,189 | 4/1942 | Wright | 30/132 |
| 3,073,025 | 1/1963 | Yatsko | 30/132 |
| 3,133,396 | 5/1964 | Leader | 56/202 |
| 3,421,302 | 1/1969 | Dahl | 56/202 |
| 3,552,013 | 1/1971 | Stone | 30/132 |
| 3,916,521 | 11/1975 | Sekelsky | 30/132 |

FOREIGN PATENT DOCUMENTS 1,210,358  10/1970  United Kingdom .................. 30/131

*Primary Examiner*—Jimmy C. Peters
*Attorney, Agent, or Firm*—Albert L. Jeffers; John F. Hoffman; Roger M. Rickert

[57] ABSTRACT

A clippings catcher for attachment to a power hedge trimmer having an elongated sickle blade assembly extending in one direction from the motor and handle assembly. The clippings catcher comprises a somewhat elongated rigid frame secured to the blade assembly and being substantially coextensive lengthwise therewith, a flexible transparent bag which is secured to the frame perimetrically of the bag opening and which extends rearwardly from the frame, and a deflector plate on the distal end of the frame which extends generally in a forward direction.

7 Claims, 5 Drawing Figures

U.S. Patent  Feb. 7, 1978  4,071,951
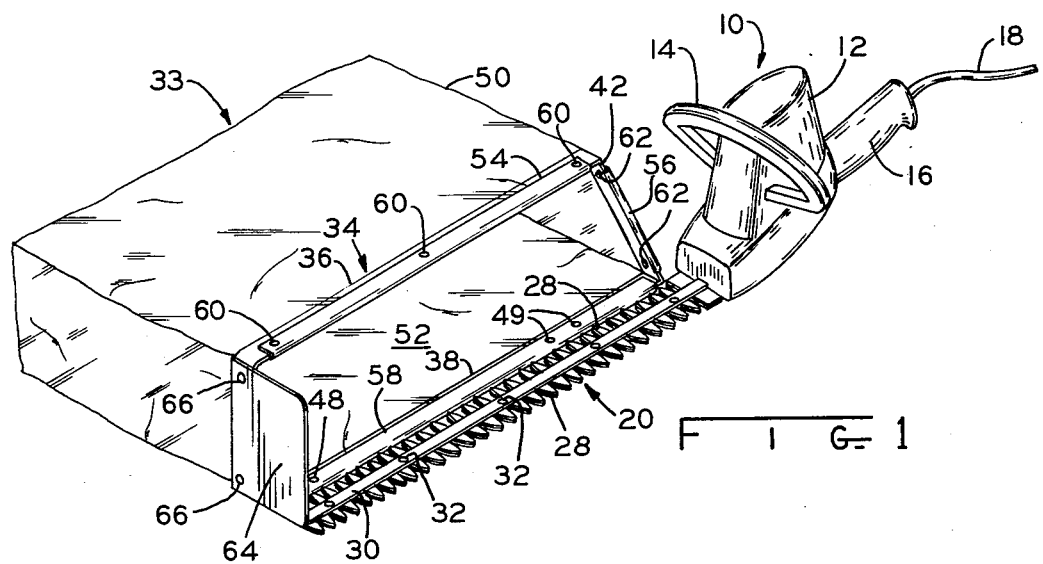
FIG. 1
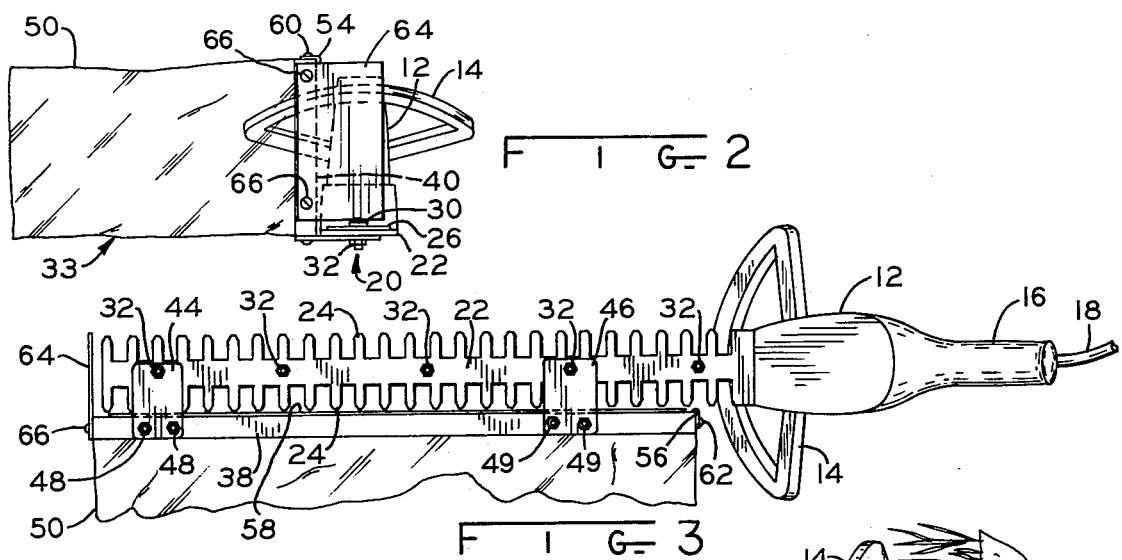
FIG. 3
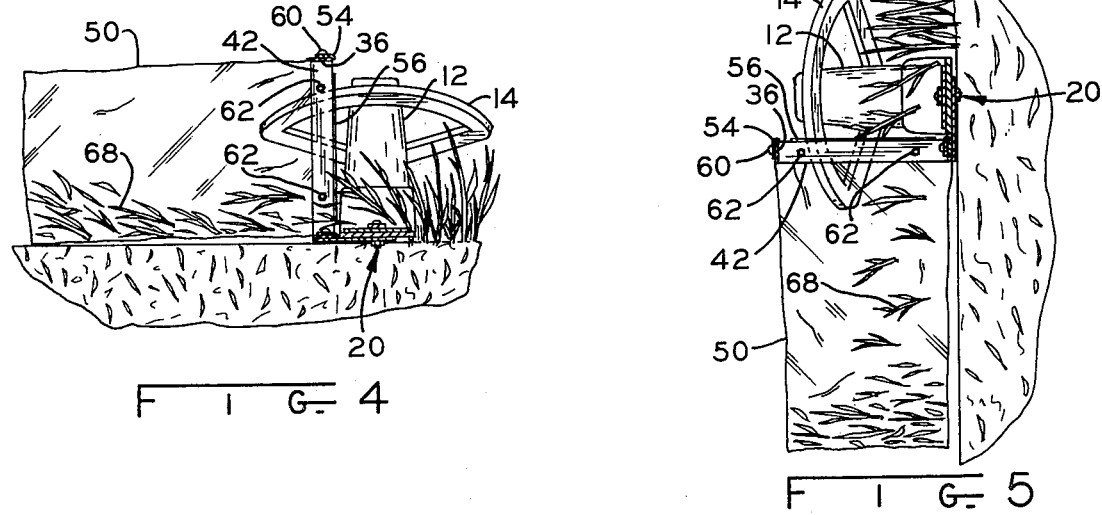
FIG. 4
FIG. 5

CLIPPINGS CATCHER FOR A HEDGE TRIMMER

BACKGROUND OF THE INVENTION

The present invention relates to an attachment adapted for mounting to a power hedge trimmer for accumulating hedge clippings.

Hedge trimmers in common use today are generally capable of trimming shrubbery in an infinite number of planes ranging from horizontal to vertical depending on the ultimate shape of the shrubbery which is desired. In certain cases, it is even necessary to orient the trimmer in a cutting plane which forms an outside angle greater than 90 degrees with respct to the horizontal, for example, in the case where the bush tapers inwardly at its base.

The trimming of shrubbery normally produces a great quantity of clippings, many of which are quite small and very difficult to retrieve. Also, certain varieties of shrubbery have thorns which further increases the difficulty of retrieval and disposal. In order to facilitate collection of the clippings, a number of prior art hedge trimmer attachments have been proposed but, as will be seen, none of them possesses a sufficient degree of universality to enable efficient collection regardless of the angle of the cutting plane.

For example, U.S. Pat. No. 3,916,521 discloses a hedge clippings catcher comprising a tray mounted to the sickle bar of the hedge trimmer and which may be angularly adjusted to lie within a horizontal plane when the blade assembly is oriented vertically. When trimming in a horizontal direction, the catcher tray is repositioned so that it forms an angle of about 30° with respect to the cutting plane. The primary drawback to this arrangement, however, is that numerous adjustments to the catcher tray are necessary as the trimmer is operated in various planes. This is particularly inconvenient when trimming individual bushes or when the desired shape is rounded as opposed to rectangular.

The clippings attachment disclosed in U.S. Pat. No. 3,073,025 comprises a first extension plate which is rigidly secured to the sickle bar and a second extension plate hingedly connected to the first plate. When trimming in a horizontal direction, the plates are adjusted so as to be coplanar whereas vertical trimming necessitates adjustment of the pivotal plate to a position perpendicular to the first plate. This arrangement suffers from the same drawbacks as the first prior art catcher, namely, the necessity for frequent readjustment when trimming at a variety of angles. Furthermore, the use of a generally planar tray limits the amount of clippings which can be collected before emptying is necessary. This is particularly true when trimming in the vertical direction. A somewhat similar device is shown in U.S. Pat. No. 2,281,289 wherein the trays are made of metal mesh.

The hedge clipper attachment disclosed in U.S. Pat. No. 3,552,013 includes three side walls which are rigidly connected to a base plate so that a tray open on two sides is provided. When trimming in the vertical direction, it is obvious that the clippings will not be contained so that the effectiveness of this attachment is limited unless trimming is confined to a plane which is more nearly horizontal. Other examples of prior art include U.S. Pat. Nos. 3,795,050 and 2,510,311.

None of the prior art attachments discussed above includes means whereby the clippings may be collected when trimming in a plane beyond the vertical as in the case where the shrubbery tapers inwardly towards its base. Obviously, if the prior art devices are oriented in this manner, the clippings would immediately slide off.

SUMMARY OF THE INVENTION

The present invention overcomes the problems and disadvantages of the prior art by providing a clippings catcher which comprises a flexible bag having its opening positioned adjacent to the hedge trimmer blade assembly. The bag opening is maintained in a vertical plane relative to the blade assembly so that the clippings are caught and retained within the bag regardless of whether the cutting plane of the trimmer is horizontal, vertical or at an angle beyond the vertical.

The bag is made of a soft, flexible, vinyl plastic resistant to tearing which will follow the blades over the contours of the shrubbery. The bag is preferably transparent so that the user may easily see the level of clippings which have collected therein.

More specifically, the present invention relates to a clippings catcher for attachment to a shrubbery trimmer of the type including an elongated sickle blade assembly. The collector comprises: a rigid frame having a central opening bordered by spaced upper and lower frame sections and spaced side sections extending between the upper and lower sections, the upper and lower sections being longer than the side sections so that the opening is generally elongated; a flexible bag secured to the frame perimetrically of the bag opening and extending rearwardly from the frame; a deflector plate being secured to one of the frame side sections and extending generally forwardly from the frame; and means on the lower frame section for attaching the frame to the blade assembly of a hedge trimmer.

It is an object of the present invention to provide a catcher for a attachment to a hedge trimmer having a bag attached behind the blade assembly with its opening extending perpendicular to the cutting plane so as to effectively catch and retain the clippings regardless of whether the cutting plane is horizontal, vertical, or any angle therebetween.

Another object of the present invention is to provide a catcher for attachment to a hedge trimmer wherein no adjustments are necessary when changing from a horizontal cuttin plane to a vertical cutting plane, or vice versa.

Another object of the present invention is to provide a catcher for attachment to a hedge trimmer having a lightweight, flexible bag, thereby enhancing the maneuverability of the trimmer. and enabling contour cutting without interference between the catcher and surface of the shrubbery.

Another object of the present invention is to provide a catcher for attachment to a hedge trimmer including a deflector plate which assists in channeling clippings produced at the distal end of the blade assembly into the bag.

Yet another object of the present invention is to provide a catcher for attachment to a hedge trimmer having a transparent bag so to as enable the operator to visually determine the amount of clippings that have been collected.

A still further object of the present invention is to provide a catcher for attachment to a hedge trimmer which is capable of catching clippings which are produced when the trimmer is operated in a plane slightly beyond the vertical direction as in the case where overhanging portions of the shrubbery are to be trimmed.

A still further object of the present invention is to provide a catcher for attachment to a hedge trimmer which is relatively simple in construction and economical to produce.

These and other features and objects of the present invention will become more apparent by reference to the following description of a preferred embodiment of the invention taken in conjunction with the accompanying drawings.

BRIEF DESCRIPTION OF THE DRAWINGS

FIG. 1 is a perspective view of the clippings catcher mounted to a power hedge trimmer in accordance with the present invention;

FIG. 2 is a side elevational view of the apparatus as viewed from the left side of FIG. 1;

FIG. 3 is a partial bottom view of the apparatus showing the manner in which the catcher is secured to the hedge trimmer;

FIG. 4 is a view showing the apparatus cutting in a horizontal plane; and

FIG. 5 is a view showing the apparatus cutting in a vertical plane.

DESCRIPTION OF THE PREFERRED EMBODIMENT

Referring now to the drawings, there is shown a standard hedge trimmer 10 which comprises a motor housing 12, handles 14 and 16, a power cord 18 and a blade assembly 20. Blade assembly 20 comprises a double-edged blade 22 rigidly secured to housing 12 and having a plurality integral sharpened teeth 24, and a second blade 26 which is reciprocated by the motor and which also includes a plurality of integral cutting teeth 28 on either side. A retaining bar 30 is secured to stationary blade 22 by means of bolts 32, and reciprocating blade 26 is slotted so as to permit it to slide relative to bolts 32. The invention is not limited to hedge trimmers having this particular construction, however, but is capable of attachment to any hedge trimmer having an elongated sickle blade.

The clippings catcher 33 of the present invention comprises a frame 34 in a form of a closed loop having an upper section 36, a lower section 38 spaced from and generally parallel to upper section 36, a side section 40 which is generally at right angles to sections 36 and 38, and a second side action 42 which, due to the particular construction to the hedge trimmer 10, forms an acute angle with lower section 38. Clearly, the shape of frame 34 is not limited and will depend on the particular hedge trimmer to which it is attached. Generally speaking, however, it is preferable that the frame 34 be elongated and extend the entire length of blade assembly 20. Preferably, frame 34 is made of a lightweight yet strong material such as aluminum so that user fatigue is lessened and the apparatus is maneuverable.

Frame 34 is attached to stationary blade 22 by means of a pair of mounting plates 44 and 46 which are secured to lower frame section 38 by bolts or rivets 48 and 49 and to blade 22 by means of bolts 32. Plates 44 and 46 serve to support frame 34 in a plane which is generally perpendicular to the cutting plane as defined by the orientation of teeth 24 and 28.

A bag 50, which is made of soft, flexible, transparent vinyl plastic, is secured to frame 34 perimetrically around its opening 52. Bag 50 is preferably of sufficiently heavy gauge so that it is resistant to tearing as it is pulled over the surface of the shrubbery. The opening 52 of bag 50 is positioned around frame 34 and secured thereto by means of metal strips 54, 56, and 58 which in turn are fastened to frame 34 by bolts 60, 62, 49, and 48. A deflector plate 64 is fastened to the left side section 40 of frame 34 by bolts 66 and serves to channel clippings cut by the distal end of blade assembly 20 into bag 50. If desired, a second plate (not shown) may be provided at the proximal end of blade 20 and secured to side section 42 in a similar fashion. In the preferred embodiment, bag 50 is not completely limp but possesses a slight degree of stiffness so as to generally hold its shape and extend rearwardly from frame 34. The bag 50 is not rigid, however, as this would interfere with its ability to follow the blade 20 over the contours of the shrubbery.

In use, the catcher 33 will follow the hedge trimmer 10 as it cuts the shrubbery and the clippings 68 produced thereby will be caught by bag 50. Cutting in a horizontal plane is illustrated in FIG. 4 wherein the clippings are caught by virtue of the bag opening 52 being in close proximity to blade assembly 20. In FIG. 5, cutting in a vertical plane is illustrated wherein the cuttings drop through the bag opening. Even if the hedge trimmer 10 should be oriented so that the cutting plane is rotated past the vertical direction (as if the trimmer were rotated more than 90 degrees counterclockwise from the horizontal position shown in FIG. 4), the clippings 68 would still fall through the bag opening 52. When cutting in a horizontal plane (FIG. 4), the clippings 68 may be shifted to the rear of bag 50 by a quick turn of the user's wrist. In FIGS. 4 and 5, the deflector plate 64 has been removed.

What is claimed is:

1. A clippings catcher for attachment to a hedge trimmer of the type including an elongated sickle blade assembly, said collector comprising:
   a rigid frame having a central opening bordered by spaced upper and lower frame sections and spaced side sections extending between said upper and lower sections, said upper and lower sections being longer than said side sections so that said opening is generally elongated,
   a flexible bag having an opening, said bag being secured to said frame perimetrically of said bag opening and extending rearwardly from said frame,
   a deflector plate being secured to one of said frame side sections and extending generally forwardly from said frame, and
   means on said lower frame section for attaching said frame to the blade assembly of a hedge trimmer.

2. The clippings collector of claim 1 wherein said bag is made of transparent plastic.

3. The clippings collector of claim 1 wherein said bag is made of a slightly stiff material.

4. In combination with a hedge trimmer having handle means and a motor driven elongated sickle blade assembly extending in one direction from said handle means, a clippings catcher comprising:
   a rigid frame having spaced upper and lower sections and a pair of spaced side sections extending between said upper and lower sections, said frame sections defining a central opening,
   said lower section being secured to said blade assembly and being substantially coextensive lengthwise therewith, and a flexible bag having an opening, said bag being engaged by said frame perimetrically of said bag opening.

5. The combination of claim 4 wherein said bag is made of transparent plastic.

6. The combination of claim 4 wherein said blade assembly lies in a cutting plane and said frame and said frame opening lie in a plane perpendicular to said cutting plane.

7. The combination of claim 4 wherein said bag is made of a slightly stiff material.

* * * * *